United States Patent [19]

Billings

[11] Patent Number: 5,637,230

[45] Date of Patent: Jun. 10, 1997

[54] WATER TREATMENT METHOD AND APPARATUS FOR ADDING CALCIUM HYPOCHLORITE TO POTABLE WATER

[75] Inventor: Arnold A. Billings, Gilbert, Ariz.

[73] Assignee: City of Chandler, Chandler, Ariz.

[21] Appl. No.: 320,952

[22] Filed: Oct. 12, 1994

[51] Int. Cl.$^6$ ............................................. C02F 1/76
[52] U.S. Cl. ...................... 210/739; 137/93; 137/888; 210/96.1; 210/101; 210/206; 210/744; 210/756; 422/263
[58] Field of Search ........................... 210/86, 96.1, 97, 210/134, 198.1, 206, 739, 754, 764, 744, 101, 167, 756; 422/37, 110, 111, 106, 261, 263, 264, 277; 137/453, 93, 268

[56] References Cited

U.S. PATENT DOCUMENTS

| | | | |
|---|---|---|---|
| 991,825 | 5/1911 | Bogie | 210/198.1 |
| 1,211,481 | 1/1917 | Noble | 210/754 |
| 1,593,109 | 7/1926 | Wallace | 137/453 |
| 3,267,964 | 8/1966 | Steinmetz | 137/93 |
| 3,474,817 | 10/1969 | Bates et al. | 137/268 |
| 3,746,170 | 7/1973 | Bloom et al. | 210/198.1 |
| 3,802,845 | 4/1974 | Tepas . | |
| 3,846,078 | 11/1974 | Brett | 210/198.1 |
| 4,051,034 | 9/1977 | Amon . | |
| 4,202,364 | 5/1980 | Karr | 137/888 |
| 4,260,587 | 4/1981 | Braden | 210/198.1 |
| 4,347,687 | 9/1982 | Sibbel | 137/453 |
| 4,732,689 | 3/1988 | Harvey et al. | 422/37 |
| 5,256,299 | 10/1993 | Wang . | |
| 5,405,540 | 4/1995 | Tang | 210/754 |
| 5,419,355 | 5/1995 | Brennan et al. | 422/261 |
| 5,447,641 | 9/1995 | Wittig | 422/37 |
| 5,468,377 | 11/1995 | Clavin et al. | 210/167 |

FOREIGN PATENT DOCUMENTS

| | | | |
|---|---|---|---|
| 2244490 | 10/1987 | Japan | 210/96.1 |
| 94/20191 | 9/1994 | WIPO | 422/37 |

*Primary Examiner*—Joseph W. Drodge
*Attorney, Agent, or Firm*—O'Connor Cavanagh; Donald J. Lenkszus

[57] ABSTRACT

Apparatus and method are provided for the treatment of potable water. A non-pressurized chlorinator has a first chamber which receives solid calcium hypochlorite tablets. A portion of the potable water flows into the first chamber to produce a chlorine solution in a second chamber of the chlorinator. An eductor is connected in a potable water flow line and draws the chlorine solution from the second chamber to chlorinate the water. A third chamber in fluid communication with the second chamber includes level sensors to control the flow of water into the chlorinator. The use of pumps for injection of chlorine into the potable water supply is eliminated thereby providing a highly reliable and cost effective system. The system is particularly advantageous in that it does not rely upon the use of chlorine gas nor is it necessary to transport or store highly unstable liquid chlorine.

11 Claims, 1 Drawing Sheet

WATER TREATMENT METHOD AND APPARATUS FOR ADDING CALCIUM HYPOCHLORITE TO POTABLE WATER

BACKGROUND OF THE INVENTION

This invention pertains to a method and apparatus for the treatment of potable water supplies. More particularly, the invention pertains to the use of solid calcium hypochlorite as a disinfecting agent for the treatment of municipal water supplies.

Municipal water production facilities currently use chlorine gas as the primary disinfectant. In October, 1992, chlorine was reclassified by the United States Department of Transportation (DOT) from a non-flammable gas to a poison-inhalation hazard. This reclassification results in transportation restrictions. A vehicle transporting hazardous materials such as chlorine must not be parked on or within five feet of the traveled portion of public street or highway except for brief periods when the necessities of operation require the vehicle to be parked and make it impracticable to park the vehicle in any other place. Unless there is no practicable alternative, a motor vehicle which contains hazardous materials must be operated over routes which do not go through or near heavily populated areas, places where crowds are assembled, tunnels, narrow streets, or alleys.

In response to these regulatory requirements, distributors of chlorine have determined that they cannot meet the regulatory requirements and therefore, are unwilling to make such deliveries.

In addition to increased regulations governing the transportation of chlorine, the United States Uniform Fire Code requires that each chlorine system be designed to handle the accidental release of gas from the entire contents of the largest single source of gas (Uniform Fire Code Sections 80.301–80.306). The cost of installing such equipment at municipal production well sites is excessive. With mounting restrictions on transporting, handling, and storing chlorine gas, it is important that alternative methods of disinfection be developed for municipal water production facilities.

One alternative method of disinfection is liquid sodium hypochlorite (NaOCl). However, upon investigation, a number of disadvantages of this disinfectant have been discovered. Sodium hypochlorite is not very stable at the solution concentrations typical for water disinfection. During storage, this instability results in a loss of strength within a few weeks. In addition, along with the product degradation, chlorites and chlorates are formed. It is believed that in the future, United States Environmental Protection Agency (EPA) regulations may control these disinfection byproducts.

It is, therefore, desirable to provide a method and apparatus for treatment of potable water which does not use chlorine gas or liquid sodium hypochlorite.

Solid calcium hypochlorite ($Ca(OCl)_2$) is not subject to the aforementioned transportation restrictions and has the advantage that it has a shelf life of over two years during which time the chemical retains its full strength. More specifically, calcium hypochlorite can be shipped as a relatively stable solid containing 70% or more available chlorine.

Solid calcium hypochlorite is commonly utilized to treat swimming pools. In conventional methods of application in swimming pools, tablets are placed in the pool skimmer or in dissolving baskets around the pool. The level of residual chlorine is not easily controlled with these approaches and therefore they are not suitable for application to the production of potable water.

In addition to the basket and skimmer devices, other devices have in the past been developed for using solid soluble material for treating water. Several such devices are discussed in U.S. Pat. No. 3,802,845. However, these prior devices, as well as the one described in the '845 patent, are not suitable for use in water production operations.

Apparatus which has been designed for use with solid calcium hypochlorite are commercially available but are not insertable into a pressurized system. Typical solid calcium hypochlorite feeders utilize a pump on the outlet of the feeder to pump the chlorine solution formed from the solid calcium hypochlorite. These chlorinators have the further disadvantage that the influent to the device would have to exactly match the effluent flow capacity of the pump. Otherwise, cavitation occurs in the pump or flooding of the chlorinator could occur. If flooding occurs in the chlorinator, the solid calcium hypochlorite liquefies. In addition, calcium buildup occurs in the pump impeller housing resulting in impeller or seal damage.

In the prior systems, batches of chlorine solution are produced from the solid calcium hypochlorite and the batch is pumped into the water.

It is therefore one object of the invention to provide a method and apparatus for the treatment of potable water which will not require the use of chlorine gas or other hazardous material.

It is a further object of the invention to provide a method and apparatus for treatment of potable water utilizing an unpressurized chlorinator tank.

It is yet another object of the invention to provide a method and apparatus for the treatment of potable water in which maintenance of the apparatus is reduced.

SUMMARY OF THE INVENTION

The foregoing objects and other objects are achieved in a method and apparatus in accordance with the principles of the invention.

In a water treatment system in accordance with the principles of the invention, solid calcium hypochlorite is utilized as the source of disinfectant.

In a water treatment system in accordance with the invention, a chlorinator has a first chamber for receiving and holding solid calcium hypochlorite tablets. A second chamber is in fluid communication with the first chamber. A water inlet supplies water through the first chamber to produce a chlorine solution in the second chamber. The chlorinator is of the nonpressurized type open to the atmosphere.

An eductor is used having a main flow passage through which the potable water flows. An eduction passage of the eductor is coupled to the second chamber of the chlorinator to educt the chlorine solution from the second chamber into the potable water.

A controller is provided so that operation of the system is automatic. A residual chlorine analyzer determines the level of residual chlorine in the potable water supply. The controller responds to the measured residual chlorine level by controlling a valve which adjusts the flow of water through the eductor to maintain the residual chlorine level within a predetermined range.

Further in a process in accordance with the invention, a chlorinator is utilized to form a chlorine solution from solid calcium hypochlorite. The chlorine solution is added to the potable water by utilizing an eductor.

Still further in accordance with the invention, a control tank is coupled to a chlorinator such that the level of water in the control tank is substantially the same as the liquid level in the chlorinator. By using a separate tank containing water to which liquid level sensors are coupled, problems which occur from directly sensing liquid levels in the chlorinator such as calcium buildup are avoided.

Other advantages of the invention will be apparent from a reading of the following detailed description.

BRIEF DESCRIPTION OF THE DRAWINGS

The invention will be better understood from a reading of the following detailed description of the illustrative embodiment of the invention taken in conjunction with the drawing in which like elements are identified with like designations among the several figures and in which.

DETAILED DESCRIPTION

The present invention has been developed and tested at municipal water treatment facilities in the City of Chandler, Ariz. In these experimental tests of the invention, the system has been utilized to treat one to two million gallons of well water daily.

Figure 1:
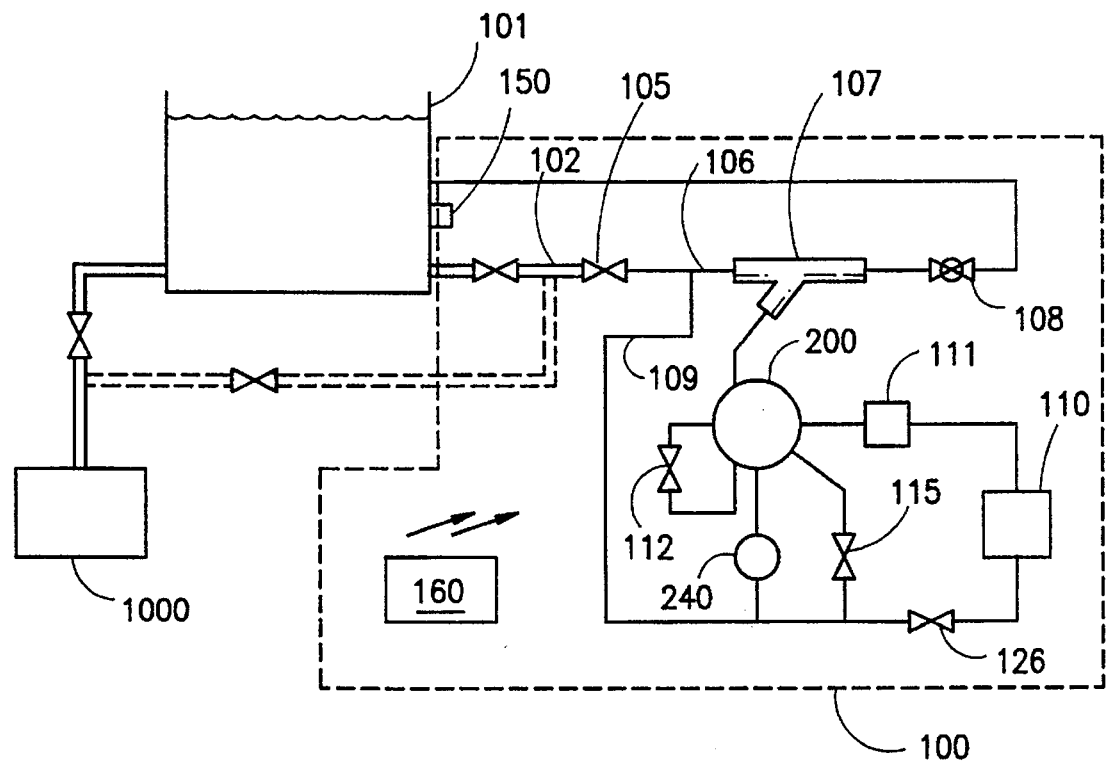
FIG. 1 illustrates in block diagram form a system in accordance with the principles of the invention.

The system 100 as shown in FIG. 1 is in fluid communication with a main water storage tank 101. Tank 101 may be filled in two ways. It can be filled through system 100 in which case untreated water is circulated through system 100 and into tank 101 as shown by phantom connection 1001. Alternatively, the tank 101 may be directly filled from, a source, for example, a well 1000. In this second instance, the inlet 102 to system 100 may be in fluid communication with tank 101 and recirculates water from tank 101 through system 100.

The system in accordance with the invention is readily connected into existing water treatment facilities utilizing gaseous chlorination. The present system can provide chlorination at exactly the same flow in the water treatment facility as a gas chlorinator. Thus the system of the present invention is easily retrofitted into existing water production facilities.

Figure 2:
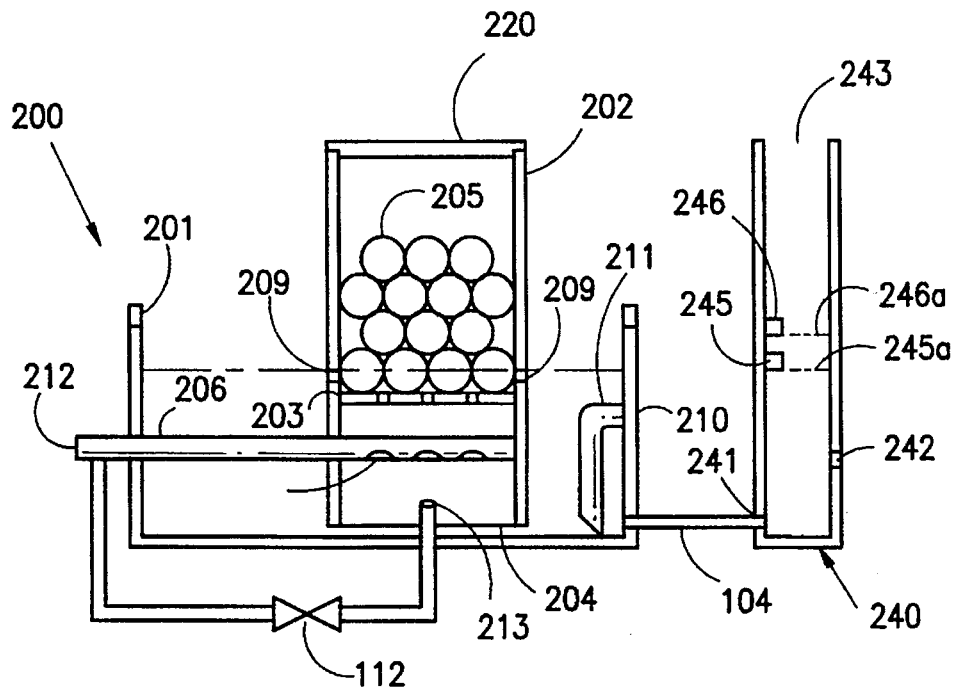
FIG. 2 illustrates a chlorination tank and control tank assembly.

To better understand the system, a chlorination tank arrangement which is particularly well-suited to this application is shown in FIG. 2. FIG. 2 shows in cross-section a chlorinator 200 and a control tank 240. Chlorinator 200 includes an outer tank or chamber 201 and an inner tank or chamber 202. Tank 201 has its upper end open to the atmosphere. Chamber 202 is closed off at its upper end by a sealing cover 220. Chlorinator 200 is a commercially available chlorinator which has been modified.

Inner tank 202 includes a support plate 203 positioned above the bottom 204 of the tank. In tank 202, solid tablets 205 of calcium hypochlorite are loaded and supported on plate 203.

A water inlet pipe 206 extends from the outside of tank 201 through wall of tank 202. Pipe 206 is capped at its end. Pipe 206 includes multiple apertures 207 oriented primarily toward the bottom of tank 202.

One or more apertures 208 are provided in plate 203 to permit water to flow upward in tank 202 into contact with the tablets 205. Apertures 209 in the wall of tank 202 permit chlorine solution to flow from tank 202 to tank 201. An outlet aperture 210 is provided in the wall of tank 201.

The chlorinator 200 has been modified as follows. A tube 211 extends from aperture 210 to the bottom of tank 201 to permit liquid to be drawn from the bottom of tank 201. Also included is a tap 212 and an aperture 213. Tap 212 is in line 206. Aperture 213 is in the sidewall of and near the bottom of tank 201. The tap 212 and aperture 213 permit the tanks 201 and 202 to be in fluid communication with each other such that the tank 202 may be drained.

A control tank or chamber 240 has an outlet aperture 241 coupled to the chlorinator 200 via a pipe 104. Control tank 240 has a clean water inlet 242. Two liquid level sensors 245, 246 are positioned on the control tank 240 to provide control signals when the corresponding fluid levels 245a and 246a are reached. Each of the liquid level sensors 245, 246 may be of conventional design and in the illustrative embodiment are float switches.

The position of liquid level sensor 245 is selected to correspond to a desired liquid level 245a in the tank 202. The position of liquid level sensor 246 is selected to correspond to a level higher. This higher level is indicative of an undesired liquid level.

The operation of the chlorinator 200 and the control tank 240 is as follows: Calcium hypochlorite tablets 205 are loaded into the tank 202. Untreated water flows into the chlorinator through pipe 206. Pipe 206 discharges the water through aperture 207 in tank 202. As the water level in tank 202 rises, it flows through the apertures 208 in plate 203 and covers a bottom portion of the load of tablets 205 in tank 202.

Chlorine solution is thereby formed which flows via aperture 209 into tank 201 from which it is drained out via pipe 211 and aperture 210.

Tank 240 is provided to monitor the liquid level in tank 202. Clean water is allowed to flow into the tank via aperture 242 and out to the chlorinator 200 via aperture 241 and pipe 104. The upper end of tank 240 is open to the atmosphere. Because water seeks its own level, the water level in control tank 240 will be substantially the same as the liquid level in chlorinator 200. Thus, the liquid level in the chlorinator may be sensed by means of sensors 245 and 246 without subjecting the sensors to the chlorine solution.

Turning back to FIG. 1, the chlorinator system includes a chlorine analyzer 150 of a type which is commercially available. Chlorine analyzer 150 detects the residual chlorine level in the water in tank 101. If the chlorine analyzer indicates that additional chlorination is necessary, a controller 160 will simultaneously operate main flow valves 105 and 108 as well as valve 126. Valve 108 is a commercially available motorized ball valve. A ball valve is particularly advantageous in this application because of its self-cleaning action as it opens and closes.

With valves 105 and 108 open, water flows through pipe 106, through an eductor 107 and through valve 108 into the tank 101.

The eductor 107 is of a type which is commercially available.

The water also flows via pipe 109 to valve 126 to a pressure regulator 110 also of a conventional type through a rate of flow controller 111 to the chlorinator 200. The rate of flow controller is also commercially available.

Turning back to FIG. 2, as water enters the chlorinator 200 a chlorine solution is created in the chlorinator 200. The solution concentration is maintained by the level of water in contact with the calcium hypochlorite tablets. The level is controlled by controller 160 in response to the level switch 245 of control tank 240. The controller 160 will cause valve 106 to be open as long as the liquid level in chlorinator 200 is less than the level of level switch 245. As shown in FIG. 1, the rate of flow controller 111 meters the feed water supplied to the chlorinator 200 to provide stability in the chlorine solution concentration. The second liquid level sensor 246 shown in FIG. 2 will signal controller 160 to indicate a fault or alarm condition in the system in the event that the liquid level in the chlorinator 200 reaches a high level. In the event the alarm condition is reached, the controller 160 will cause valve 126 to close. If within a predetermined time interval the level switch 246 indicates that the liquid level has fallen below level 246a and level switch 245 indicates that the level has fallen below level 245a, then the controller 160 will open valve 126.

If level switch 246 does not indicate that the liquid level has fallen after a predetermined time interval, a second level failure alarm may be indicated.

In the event that level sensors 245 and 246 both operate, the controller 160 may continue to operate the system by cycling valve 126 on and off to maintain the liquid level within the chlorinator between the levels 245a and 246a.

It is desirable to maintain the level of the chlorination below a predetermined liquid level 246a. If the level in the chlorinator is allowed to rise too high, the solid tablets will disintegrate at an accelerated rate.

The chlorine solution in the chlorinator 200 is drawn out via the eductor 107. When the chlorine residual analyzer 150 signals that the proper chlorine residual level has been obtained, the controller 160 will cause valve 126 to close.

For a predetermined time period after the closing of valve 126, the controller 160 opens the bypass valve 112 which places the bottom of tank 201 in communication with tank 202 as seen in FIG. 2. During this predetermined time period, valves 105 and 108 remain open so that eductor 107 continues to draw chlorine solution from the chlorinator 200. However, with the valve 112 open, the chlorine solution is evacuated from both the inner and outer tanks of the chlorinator. When the predetermined time period expires, the valves 105, 108 and 112 are closed by the controller 160 thereby ending this cycle of the chlorine feed. The pipe 211 extends from aperture 210 to the bottom of tank 201 assures that substantially all the solution will be drained out of the chlorinator 200.

In addition, a valve 115 is provided to rinse the chlorinator 200. This valve 115 is opened manually by personnel onsite. However, as will be appreciated by those skilled in the art, the rinse operation may be performed automatically by means of the controller 160. There is a manual/auto switch on the control panel that allows valves 112, 105 and 108 to be opened by overriding the automatic control circuit.

By providing for the draining and rinsing of the chlorinator 200, at the end of a cycle, the chlorinator will not contain a chlorine solution when maintenance is performed.

It should be apparent to one skilled in the art that the controller utilized in the system of the invention can be a commercially available programmable logic controller, or a relay operated controller or a microprocessor based system.

It should also be apparent to those skilled in the art that various modifications may be made to the apparatus and process of the embodiment without departing from the spirit or scope of the invention.

What is claimed is:

1. Apparatus for chlorination of potable water comprising:
    a non-pressurized chlorinator comprising a first chamber for receiving and holding solid calcium hypochlorite, a second chamber in fluid communication with said first chamber and a water inlet for supplying a flow of said potable water through said first chamber to produce a chlorine solution in said second chamber, said second chamber being open to the atmosphere and said second chamber having an outlet;
    an eductor having a main flow passage through which said potable water flows and having an eduction passage in fluid communication with said outlet to educt said chlorine solution into said potable water;
    a chlorine sensor for sensing residual chlorine in said potable water upstream of said eductor;
    a valve for controlling the flow of potable water from said eductor; and
    a controller responsive to said chlorine sensor for controlling said valve to maintain said residual chlorine within a predetermined range.

2. Apparatus in accordance with claim 1 wherein:
    said valve is a ball valve.

3. Apparatus for chlorination of potable water comprising:
    a non-pressurized chlorinator comprising a first chamber for receiving and holding solid calcium hypochlorite, a second chamber in fluid communication with said first chamber and a water inlet for supplying a flow of said potable water through said first chamber to produce a chlorine solution in said second chamber, said second chamber being open to the atmosphere and said second chamber having an outlet;
    an eductor having a main flow passage through which said potable water flows and having an eduction passage in fluid communication with said outlet to educt said chlorine solution into said potable water;
    a control tank having an inlet for receiving water, said control tank including at least one water level sensor, said control tank being open to said atmosphere and having an outlet in fluid communication with said chlorinator whereby said water level in said control tank is substantially the same as the level of said chlorine solution in said second chamber.

4. Apparatus in accordance with claim 3 comprising:
    a control valve in fluid communication with said chlorinator water inlet to control the flow of potable water thereto; and
    a controller responsive to said at least one water level sensor for operating said control valve to adjust the flow of said potable water in said first chamber to maintain said chlorine solution level in said second chamber at a predetermined level.

5. Apparatus in accordance with claim 4, further comprising:
    a first valve for controlling the flow of potable water from said eductor; and
    a chlorine analyzer for determining residual chlorine level in said potable water;
    said controller being responsive to said chlorine analyzer to operate said first valve to maintain said residual chlorine level in said potable water at a predetermined level.

6. Apparatus in accordance with claim 5 wherein:
    said first valve is a ball valve.

7. Apparatus in accordance with claim 5 further comprising:
    a flow controller disposed in series with said control valve.

8. A method for the treatment of potable water comprising:
- forming a chlorine solution in a non-pressurized chlorinator from solid calcium hypochlorite by flowing said potable water into said chlorinator: and
- mixing said chlorine solution with potable water without the use of a pump by using an educator having a main flow passage through which said potable water flows and having an eduction passage in fluid communication with said main flow passage and coupled to said chlorinator to educt said chlorine solution therefrom into said potable water;
- monitoring residual chlorine level in said potable water upstream of said eductor; and
- automatically controlling the flow of water through said eductor in response to said monitored residual chlorine level.

9. A method in accordance with claim 8 comprising the additional steps of:
- automatically draining said chlorinator at predetermined intervals.

10. A method for the treatment of potable water comprising:
- forming a chlorine solution in a non-pressurized chlorinator from solid calcium hypochlorite by flowing said potable water into said chlorinator;
- mixing said chlorine solution with potable water without the use of a pump by using an educator having a main flow passage through which said potable water flows and having an eduction passage in fluid communication with said main flow passage and coupled to said chlorinator to educt said chlorine solution therefrom into said potable water; and
- monitoring the level of said chlorine solution in said chlorinator by means of a control tank which is open to the atmosphere and through which said potable water flows into said chlorinator.

11. A method in accordance with claim 10 comprising:
- automatically controlling said chlorine solution level in said chlorinator in response to the level of said potable water in said control tank.

* * * * *